Patented Sept. 18, 1951

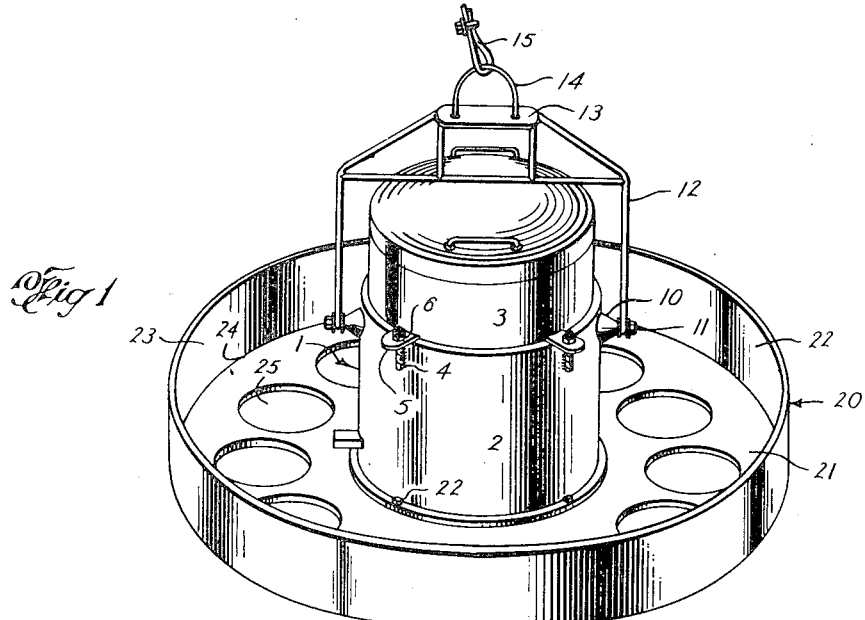
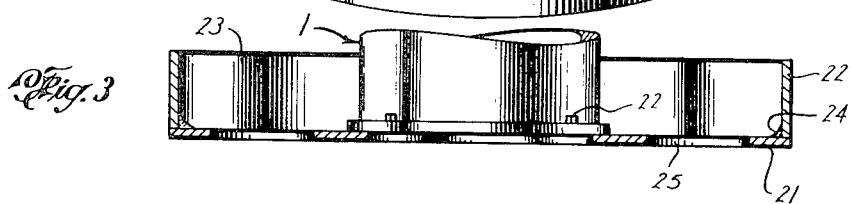
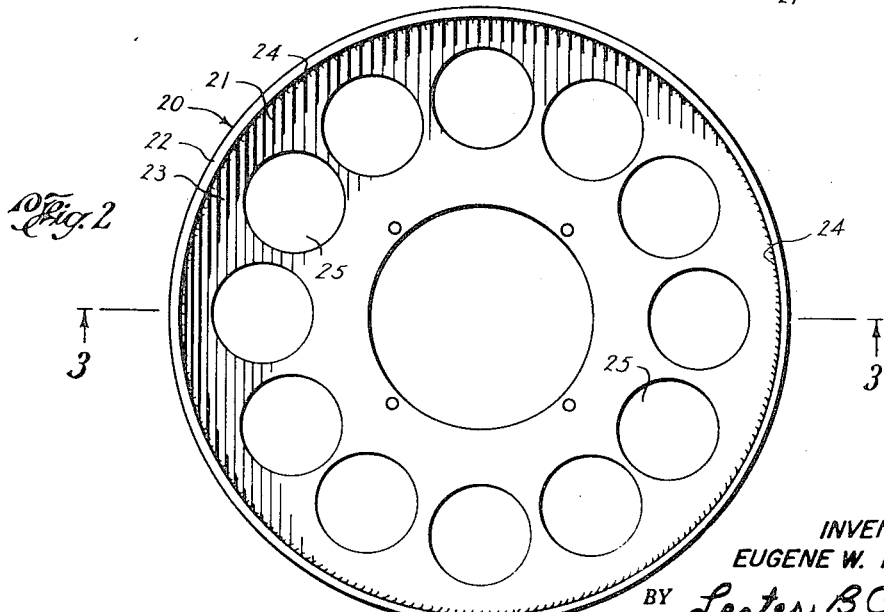

2,568,680

UNITED STATES PATENT OFFICE 2,568,680

UNDERWATER PROSPECTING DEVICE

Eugene W. Frowe, Houston, Tex., assignor to Robert H. Ray Co., a partnership composed of Robert H. Ray and J. C. Pollard, both of Houston, Tex., independently and as trustees Application November 28, 1949, Serial No. 129,858

1 Claim. (Cl. 177—352)

This invention relates to geophysical prospecting in water covered areas and is of particular utility in connection with the utilization of the gravity meter or the magnetometer in such areas.

In geophysical prospecting in water covered areas it has become established practice to lower a prospecting instrument to and position such instrument upon a submerged surface and to then obtain a reading or readings with such instrument as an indication of the nature of subsurface geological structure. Not only must the instrument be stably positioned upon the submerged surface, but its location should be definitely known and it is also important that the instrument be lowered in a manner that it is not adversely affected by movements within the submerging medium as it is either lowered or raised within that medium.

The present invention comprehends a structure for housing a prospecting instrument and capable of positioning such instrument upon the submerged surface. Such structure comprises a housing having a base plate thereon to support the device upon the submerged surface. Such base plate is so designed that it will provide a desired support for the instrument, but is also so constructed as to prevent the instrument from following a zig-zag course as it is lifted or lowered within the submerging medium. Movements of the delicate prospecting instrument in a zig zag course are highly undesirable because of their destructive effects upon the instrument, because they delay the taking of readings, and also because they cause the instrument to land at an uncertain location upon the submerged surface.

An object of the invention is to provide a support structure for a prospecting instrument so constructed and arranged that it will cause the device to move in a desirable manner to and from the submerged surface.

Another object is to provide an instrument housing having an annular base member secured thereto and extending sidewardly therefrom, such base member having a plurality of relatively large openings for the passage of water as the device is raised and lowered within the submerging medium.

Still another object is to provide a device of the class described including an annular base member and an upstanding flange thereon spaced from the housing to which the base member is secured, such structure facilitating movement in the submerging medium and providing an adequate support therefor when the device is upon the submerged surface.

The foregoing objects together with other objects and advantages will be more fully apparent from the following description considered in connection with the accompanying drawings, in which:

Fig. 1 is a perspective view showing an embodiment of the invention;

Fig. 2 is a view of the base structure removed from the instrument housing;

Fig. 3 is a vertical sectional view of the base structure taken on line 3—3 in Fig. 2.

In the drawings, there is shown at 1 a container or housing adapted to enclose a prospecting instrument as a gravity meter or magnetometer. This container comprises a lower body portion 2 and cover 3 held in place upon the body by bolts secured to the body and passing upwardly through the ears 5 having nuts 6 thereon. It is to be understood that a fluid tight seal must be provided between the body 2 and the cover 3 and that the instrument housed therein is controlled electrically from a remote point by internal mechanism controlled through a conductor cable (not shown) passing sealably through the wall of the container. The body 2 has bosses 10 thereon which terminate in pintles 11 passing through the bail 12 which terminates at its upper end in a plate 13 provided with an eye 14 to which the cable 15 is attached. The bail 12 may be swung sidewardly upon the pintles 11 so that the cover 3 may be readily removed from or placed in position upon the body 2.

The base for the instrument thus far described is shown generally at 20, and comprises an annulus 21 secured to the bottom of the housing 1 as by cap screws 22. The annulus 21 terminates at its outer edge in an upstanding flange 22 whereby there is formed a groove 23 above the annulus 21 and between the flange 22 and the housing 1. The flange 22 may be secured to the annulus 21 in any suitable manner, as by forming integral therewith or by securing same to the annulus as by means of the weld 24.

In the operation of the invention above described, the housing 1 and base 20, integrally united are lowered within a submerging medium by means of the cable 15 which passes upwardly to suitable winch mechanisms aboard the vessel from which prospecting operations are carried out. As the device is lowered within the submerging medium, the openings 25 in the annulus 21 serve as passages for the water which provides a uniform condition of turbulence within the groove 23 about the housing 1. The instrument therefore tends to follow a rectilinear course as it moves toward the submerged surface. This not only avoids destructive effects upon the instrument within the container 1, but also causes the instrument to be positioned in a known location upon bottom where instrument readings can be taken with facility after the instrument has been placed upon bottom. In a similar manner, the instrument follows a rectilinear course as it is raised from bottom and hence destructive effects upon the instrument during the lifting operation are avoided.

Broadly, the invention comprehends an instrument for submarine prospecting which enables the obtaining of prospecting measurements with facility and accuracy, and with a minimum of destructive effects upon the instrument.

What is claimed is:

An apparatus for submerging a detector instrument upon subsurface water covered areas including a container, comprising a lower body portion to receive a detector instrument, a cover therefor, a seal between said base and cover to exclude water, releasable means to clamp said cover and base to retain the instrument water tight, a bail pivoted to said container, a tow cable connected to said bail, a stabilizing base on said lower body comprising a circular base plate extending horizontally of said body, means on said body portion and said base plate to affix the body centrally thereof, a plurality of water passage openings circumferentially arranged in said plate and spaced radially outward from said body, an upstanding flange about the periphery of said base to provide a uniform condition of water turbulence between said flange and body to minimize destructive effects on the detector instrument.

EUGENE W. FROWE.

REFERENCES CITED

The following references are of record in the file of this patent:

UNITED STATES PATENTS

| Number | Name | Date |
| --- | --- | --- |
| 2,423,591 | Flude | July 8, 1947 |